(12) United States Patent
Olbrich

(10) Patent No.: US 6,840,627 B2
(45) Date of Patent: Jan. 11, 2005

(54) INTERACTIVE DISPLAY DEVICE

(75) Inventor: Craig A Olbrich, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/349,240

(22) Filed: Jan. 21, 2003

(65) Prior Publication Data

US 2004/0141162 A1 Jul. 22, 2004

(51) Int. Cl.⁷ .............................................. G03B 21/14
(52) U.S. Cl. ...................... 353/42; 353/122; 345/730
(58) Field of Search ........................... 353/42, 69, 101, 353/122; 348/745, 806; 345/730

(56) References Cited

U.S. PATENT DOCUMENTS

| | | | |
|---|---|---|---|
| 5,138,304 A | | 8/1992 | Bronson |
| 5,422,693 A | * | 6/1995 | Vogeley et al. ............. 353/122 |
| 5,504,501 A | * | 4/1996 | Hauck et al. ............... 345/158 |
| 5,617,312 A | | 4/1997 | Iura et al. |
| 5,793,441 A | | 8/1998 | Hagerman |
| 5,801,758 A | | 9/1998 | Heirich |
| 6,056,408 A | * | 5/2000 | Kobayashi .................. 353/122 |
| 6,082,865 A | | 7/2000 | Yamazaki |
| 6,246,446 B1 | | 6/2001 | Heimbuch et al. |
| 6,346,933 B1 | * | 2/2002 | Lin ............................. 345/157 |
| 6,361,173 B1 | | 3/2002 | Vlahos et al. |
| 6,382,798 B1 | | 5/2002 | Habraken |
| 6,416,185 B1 | | 7/2002 | Smith |
| 6,618,076 B1 | * | 9/2003 | Sukthankar et al. ........ 348/180 |
| 2002/0186221 A1 | | 12/2002 | Bell |

FOREIGN PATENT DOCUMENTS

| | | |
|---|---|---|
| EP | 1087327 | 3/2001 |
| WO | WO 01/47259 | 6/2001 |

* cited by examiner

Primary Examiner—William C. Dowling

(57) ABSTRACT

A display device including a light engine configured to project an image onto a display surface, an image sensor configured to capture a presentation image larger than the projected image, and a processor, coupled to the image sensor, that is configured to modify the projected image based on the captured image.

31 Claims, 2 Drawing Sheets

INTERACTIVE DISPLAY DEVICE

BACKGROUND

Image projection systems may be used to enlarge a still or video image, or to enable the image to be viewed simultaneously by a large or small audience. It is often desirable for a presentation that includes a projected image to be recorded for analysis, transmission, or for subsequent distribution. Where the presentation includes a speaker, it would be particularly helpful if the recording also included the image of the speaker with the projected image. However, recording such presentations typically requires additional equipment including cameras and recording devices, and may significantly increase the expense and difficulty of presenting the original presentation. Including the operator in the recorded image may also limit the ability of the operator to control the presentation without detracting from the projected image. For example, by facing the display surface and turning their back to the audience. It would be desirable to have a single display system that would permit the presentation to be recorded, as well as to facilitate control of the presentation in a natural and nonintrusive manner.

SUMMARY

A display device is provided, the display device including a light engine configured to project an image onto a display surface, an image sensor configured to capture a presentation image larger than the projected image, and a processor, coupled to the image sensor, that is configured to modify the projected image based on the captured image.

DETAILED DESCRIPTION

Figure 1:
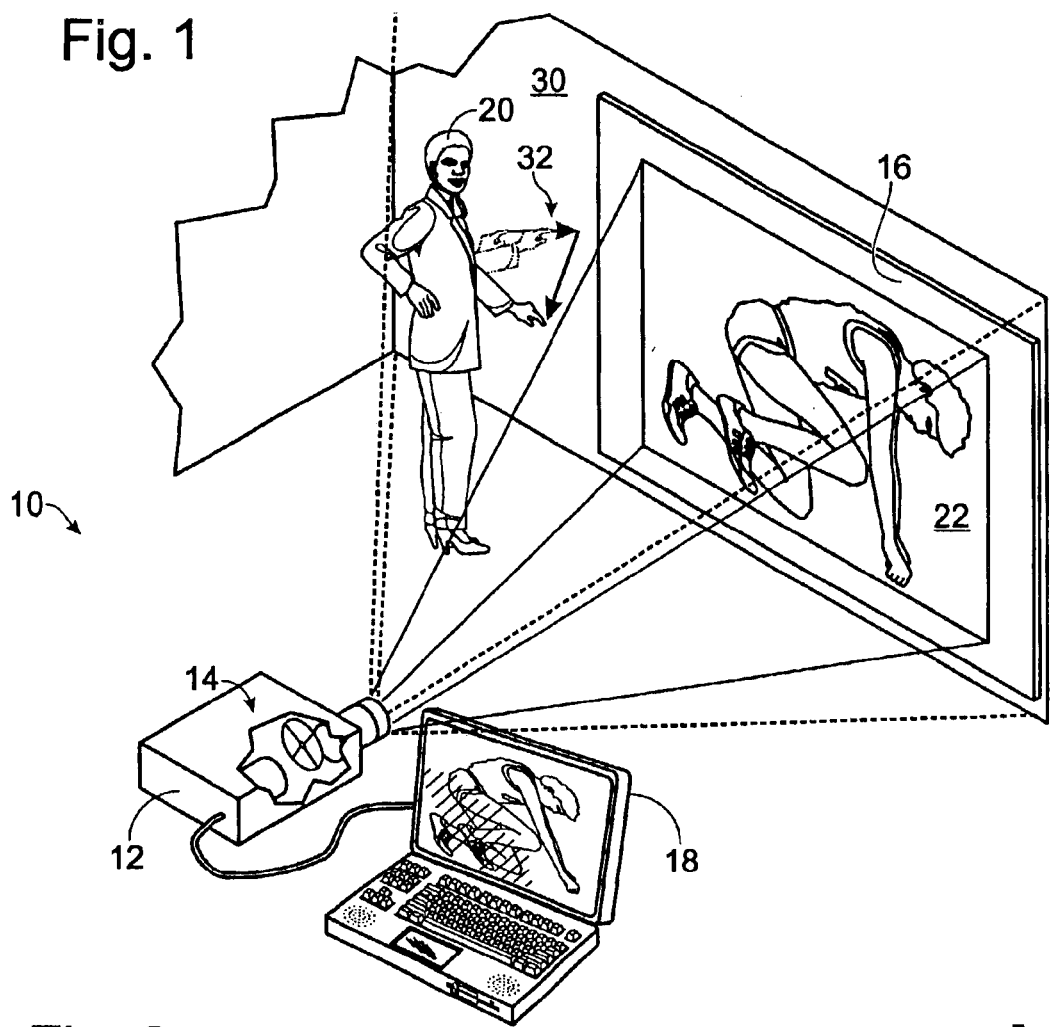
FIG. 1 is an isometric view of a display system according to an embodiment of the present invention.

In FIG. 1, a display system is shown generally at 10. System 10 may include a projector 12 including a light engine 14, a display surface 16, and an associated computer 18. Operator 20 is shown utilizing display system 10 to deliver a presentation that includes a projected image 22.

Light engine 14 of projector 12 may be configured to direct and transmit light to display surface 16 to generate a projected image that corresponds to image data received from associated computer 18. For example, and as described in more detail below, light engine 14 may be any suitable illumination source adapted to optically address display surface 16, including single white light sources (such as a mercury lamp, plasma lamp, incandescent lamp, etc.) and/or multiple white or single color light sources (such as light emitting diodes (LEDs), laser diodes, etc.). Additionally, projector 12 may include optics, spatial light modulators, scanning mirrors, focusing devices, color-generation devices, controllers, etc. for use in producing a color image on display surface 16. The projector may be an LCD projector or micromirror projector, among others.

The projector of FIG. 1 is depicted as a front projection device, however, any suitable mechanism for projecting a image may be suitable, including, but not limited to, overhead projectors and rear projection devices. For the purposes of the present disclosure, the images projected by the projector may include still images or video images and, for consistency, will be referred to herein generally as images.

In the display system of FIG. 1, projected image 22 may be viewed by a operator 20, as well as other viewers. Display surface 16 may be a screen, such as is typically employed in combination with a projection system, but any surface that is sufficiently reflective to provide a discernable image is suitable (including for example, a wall, etc.).

Figure 2:
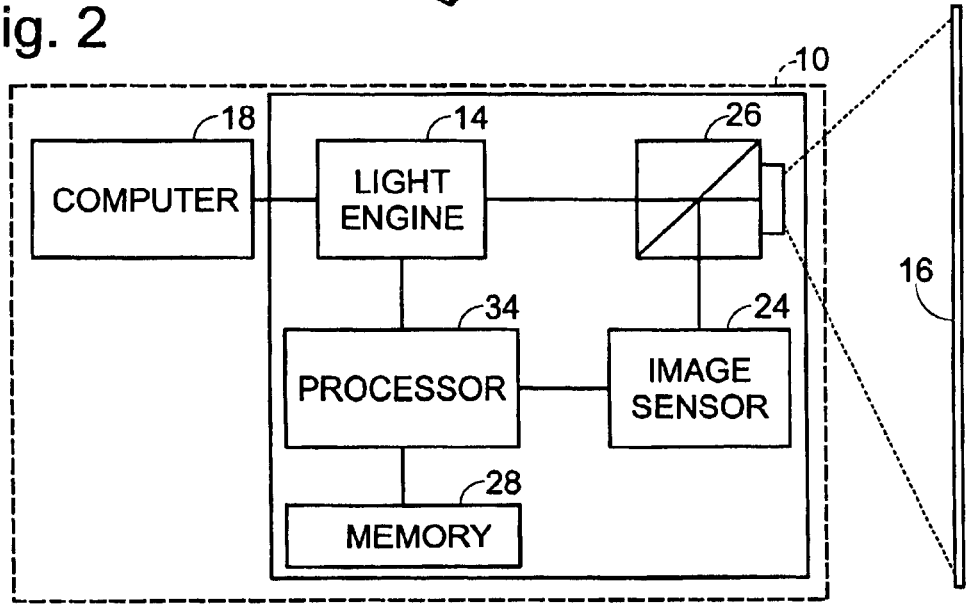
FIG. 2 is a schematic diagram of the display system of FIG. 1

Referring now to FIG. 2, it will be noted that display system 10 may include an image sensor 24. Image sensor 24 may be a light-sensitive device capable of capturing at least projected image 22. The image sensor may be a camera, such as a charge-coupled device (CCD) camera or a complementary metal oxide semiconductor (CMOS) camera. However, any other light sensor or camera with the desired light sensitivity may be useful as an image sensor for the purposes of the display system. The image sensor may be incorporated with, connected to, or otherwise associated with the projector. Alternatively, the image sensor may be incorporated with, connected to, or otherwise associated with computer 18, when present.

Where the image sensor is distinct from the projector, the image sensor may be located near the projector, so that the field of view of the image sensor closely matches the area of the projected image, and so as to minimize distortion resulting from viewing the projected image at a significant angle. Alternatively, the image sensor may be attached to the projector, such as by either mounting the image sensor on the exterior of the projector, or by incorporating the image sensor within the projector itself. In either case, the image sensor may be located so as to minimize differences in the field of view of the sensor and the area of the projected image.

The display system may share at least a portion of a single optical pathway for both image projection and image sensing. This may be accomplished, for example, by placing a beamsplitter 26 in the optical pathway of the image projector, so that the projected image generated by light engine 14 of projector 12 passes through the beamsplitter, while a portion of the reflected light is directed to image sensor 24, as shown in FIG. 2. Using a single optical pathway for both projection and image sensing may simplify several aspects of using the display system, including but not limited to calibration of the display system.

Image sensor 24 may be configured to capture projected image 22 as it appears on display surface 16. The image sensor may save the captured image in a memory 28 for storage and subsequent replay. Memory 28 may be any suitable memory device, including but not limited to memory chips, magnetic media, or optical media. Memory chips may include static random access memory (SRAM) and dynamic random access memory (DRAM) chips, among others. Magnetic media may include magnetic tape (such as video tape), magnetic diskettes, or hard drives. Optical media may include one or more writeable optical compact disks. Memory 28 may be included in projector 12. Alternatively, memory 28 may be included in associated computer 18. Once stored in memory 28, the captured image or video may be replayed using an appropriate display device, or transferred to another medium. The captured imagery may be archived, transmitted via electronic mail, or used for training purposes. The captured video file may also be transferred to optical disk, or to videotape, for storage or distribution.

The captured image may be useful for evaluating the projected image. However, a captured image of only the projected image may have understandably limited utility. Image sensor 24 may be further configured to capture an image 30 that includes not only projected image 22, but also an additional area around the projected image. For example, the captured image may include operator 20, one or more members of a viewing audience, and/or additional visual aids used to deliver the presentation. In this way a more complete record of the presentation may be obtained, including for example audience reactions, without the necessity of providing and setting up additional recording equipment.

It should be appreciated that, in order to capture the image of the typically bright presentation as well as the typically dimmer surrounding area, that the brightness of the captured image may require normalization. A variety of techniques may be used in order to avoid the loss of image information, including adaptive filtering, pixel-resolution feedback control of the image sensor exposure time, and other methods.

Instead of, or in addition to, recording expanded image 26, the image sensor may utilize the captured image to modify the operation of the projector, or to permit the operator to modify the presentation itself. For example, the captured image may be analyzed in order to correct the focus of the projected image, correct keystoning errors in the projected image, correct the colors used in the projected image, adjust the projected image to compensate for ambient light, and to improve image quality as the projected image changes.

Where the projector is configured to analyze the color of the projected image, the color characteristics analyzed may include the hue, intensity, and brightness of all or a portion of the projected image. Such color characteristics may be represented and accurately defined with reference to the coordinates of a particular color space. A color space is typically a mathematical construction that permits color information to be described numerically and/or plotted graphically. Various color spaces may be references to color values such as hue, lightness, brightness, value, reflectance, vividness, saturation, or chroma, among others. Coordinates in a particular color space may generally be converted to coordinates in an alternative color space by using an appropriate mathematical transform.

Generally, the color data is extracted from the captured image and compared to the color data specified in the image data provided to the projector, typically by computer 18. Any difference between the color data included in the image data and that of the captured image may be compensated for using a feedback system that permits the output of light engine 14 to be modified to at least partially compensate for the detected differences.

Where the image sensor is configured to permit the operator to modify the projection, the image sensor may be capable of detecting and implementing signals from the operator. The projector, and therefore the presentation, may be controlled by the operator using a wireless remote control, where the remote control communicates with the projector using infrared radiation or radio emissions. The projector may be similarly configured to respond to voice or other auditory commands. Detection and analysis of the expanded image 30 also permits the analysis of control signals presented by the operator in the captured image.

The control signals presented by the operator may be distinguished by object or pattern recognition, for example, a control signal may be communicated by virtue of display of a cue card or by making a hand signal. In many cases, the control signal may include an interpretable pattern 32. The interpretable pattern may include a pattern printed upon a cue card, a pattern drawn on a blackboard or whiteboard, or a pattern traced by an operator's hand.

The interpretable pattern may be identified for detection and analysis by the projector in any acceptable fashion. For example, where the interpretable pattern is present on a cue card, the captured image may be analyzed for the presence of a suitably disposed rectangle having a preselected color value. For example the captured image may be routinely analyzed for the presence of an orange rectangle, and upon identifying an orange rectangle, any pattern contained within the rectangle (i.e., printed on the cue card) may then be interpreted. Alternatively, where the interpretable pattern is traced on a blackboard or whiteboard, the projector may first be calibrated by drawing a suitably sized rectangle on the board, and identifying the rectangle to the projector as being a designated region for pattern interpretation. Subsequent symbols drawn in the rectangle may then be interpreted by the projector. Where the interpretable pattern is traced by the operator in the air within the borders of the expanded image, it may be useful to highlight or otherwise emphasize the operator's hand, so that the traced pattern may be readily identified and analyzed.

Where the operator traces a pattern, the traced pattern may include one or more lines, curves, or other motions forming a pattern that may be matched to a predefined pattern. The predefined pattern may include a series of one or more sequential strokes that have been associated with a command for either projector 12, associated computer 18, or any other component of display system 10. Typically, where the traced pattern matches a predefined pattern, the command associated with that pattern may be executed by display system 10.

The motions traced by the operator may be monitored continuously so that, upon the execution of any traced pattern by the operator, the associated command may be executed spontaneously. However, during the course of a presentation, the operator is likely to be constantly moving, and one or more interpretable patterns may be traced inadvertently thereby resulting in the execution of unintended commands by the display system. It may therefore be desirable for the operator to employ a method of differentiating motion used to trace an interpretable pattern from casual movement.

The display system may therefore include an activating mechanism that permits the operator to designate motion intended to control the display system. The activating mechanism may include voice recognition by the display system, such that enunciation of a trigger phrase by the operator enables interpretation of traced patterns by the display system. Alternatively, the activating mechanism may be included in a light pen, for example by directing the light beam at a photoreceptor. Alternatively, the light pen may flash a defined sequence at a light sensor, by flashing off and on a particular number of times, with a particular timing, at a particular flash rate, or any combination thereof. Such a flash pattern need not be discernible to a viewer or the operator in order to function as a signal to the display system. Alternatively, the operator may trigger a button, switch, etc. on the light pen or other remote hand-held device to activate a wireless component, such as an appropriate radio or infrared signal, that enables interpretation of traced patterns by the display system.

The image sensor may be configured to pan horizontally, pan vertically, or both so as to monitor the operator as the operator moves. The movement of the image sensor may be controlled by an algorithm such as is used by object-tracking software in various guidance or targeting systems, and may follow the shape of the operator using shape recognition, or may follow a particular hand signal or beacon, such as a light pen as discussed above. The display system may be configured to keep both the projected image and the operator within the field of view of the image sensor, or the display system may be configured to track the operator preferentially. Alternatively, the image sensor is fixed, and the operator is constrained to remain within the field of view of the image sensor.

The operator's hand may be highlighted by the presence of a glove having particular color characteristics, or by the presence of an illumination source in the operator's hand. For example, an object including a light source, such as an LED, could be held or fastened to the operator's hand. In a particular example, the operator might wear a ring having an illuminated LED on the band. The light source may be distinguished from the rest of the captured image by light intensity level, or by wavelength properties. Alternatively, the light source may be detected electronically, for example by comparing sequential captured images for evidence of motion. In this manner the changing position of the light source may be recorded over time.

Hand position information may be collected by the image sensor for interpretation by a processor 34. The processor may be a discrete and independent processor, such as, for example, included in a computer associated with the projector. Alternatively, the processor may be incorporated in the projector itself, as shown in FIG. 2. The display system may incorporate a single processor that extracts hand position information as well as performing interpretation of traced hand movement patterns. Alternatively, the display system may include multiple processors, so that data from the image sensor may first be processed by a dedicated processor that may, for example, extract positional information about the operators hand before transmitting the position information to another processor.

The pattern traced by the operator may be more readily interpreted if the positional information recorded using the image sensor is converted into motion information. Motion detection may be accomplished by tracking hand position over a set time period. For example, by identifying the position of the operator's hand in a captured image, and comparing it to the position of the operator's hand in subsequent captured images. A movement vector for the operator's hand may then be defined by the distance moved by the hand between captured images. A series of movement vectors for the hand may then be generated using the changing positions and the image capture rate. The movement vectors generally correspond to the relative motion of the operator's hand. The movement vector may then be used to interpret the pattern traced by the operator.

It should be appreciated that a variety of strategies may be employed to interpret a pattern traced by the operator. Pattern interpretation may be initiated by triggering an activating mechanism, for example by triggering a wireless signal, by voice recognition, or by flashing a light source at a higher intensity, or in a preselected flash pattern.

The traced pattern may be interpreted by determining the beginning and end points of the traced pattern. The angle between consecutive movement vectors may then be determined, and a reference rectangle may be drawn around the pattern. The reference rectangle may then be used to normalize the size of the traced pattern so as to simplify comparisons with a database of predefined stroke patterns. The database of predefined stroke patterns may be stored in memory 28 connected to processor 34. The normalized pattern may then be compared by the processor to each of the predefined patterns stored in the database to determine a corresponding display system command. Typically, the closeness of match to a predefined pattern is determined by calculation of an error function that represents how well the traced pattern matches a given predefined pattern. The predefined pattern that results in the smallest error function when compared to the traced pattern may then be selected as corresponding to the intended pattern. The command corresponding to that predefined pattern may then be executed by the processor and/or the projector.

Figure 3:
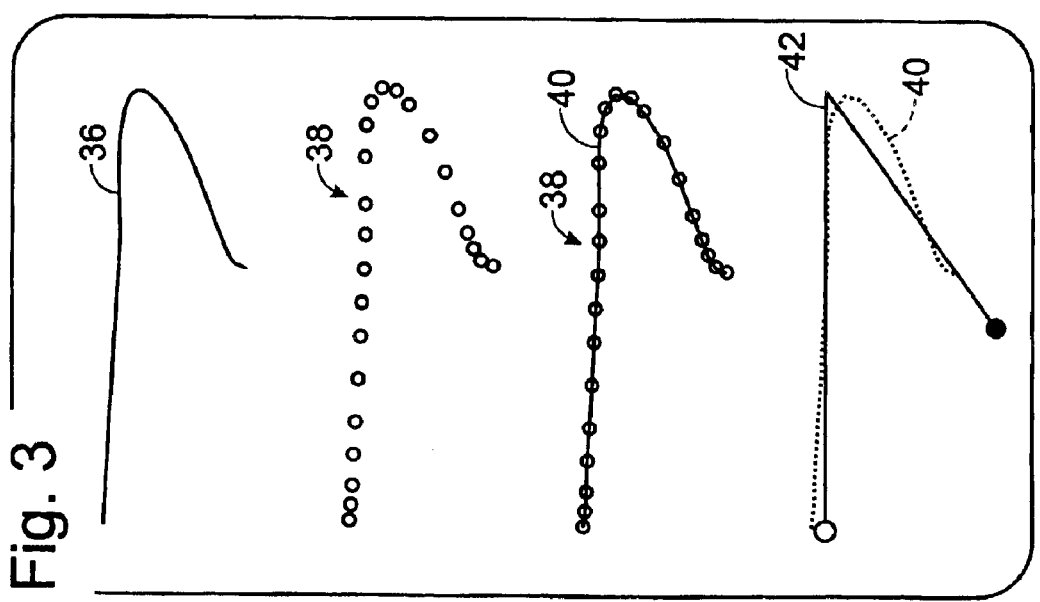
FIG. 3 illustrates capture of a traced pattern and interpretation of the traced pattern, according to an embodiment of the invention.

A simplified example of a suitable pattern interpretation method is illustrated in FIG. 3. Trace 36 represents the pattern traced within the frame of the captured expanded image by the operator, for example where the operator's hand position is being traced using the projected control spot. Video image capture of the pattern being traced generates a sequential position series 38 of the operator's hand during the pattern trace. The movement vectors 40 extracted from the sequential position series 38 may be used in a comparison to the predefined stroke patterns in the stroke pattern database, hopefully resulting in a close match, such as shown for movement vectors 40 and a closely matching predefined stroke pattern 42.

A variety of software systems already exist that are capable of interpreting handwritten patterns or hand gestures by comparing them to predefined patterns. Such software systems have been developed, for example, in order for computer systems to recognize handwritten characters, or for machine-aided interpretation of sign language. It has generally been more effective for a software system to rely upon simple predefined patterns in order to represent selected commands or characters, even where the operator is required to learn those predefined patterns. This strategy has been implemented successfully in a variety of handheld devices for text entry. These software systems utilize stroke pattern recognition where the stroke pattern is entered using a stylus and a touchpad. However, other pattern recognition strategies may be used with the display system of this disclosure.

Where the display system determines that a close match exists between the traced pattern and a predefined pattern, the display system command corresponding to the predefined pattern may be executed. Such commands may include commands executed by the processor, but the executed commands may be related to any aspect of the display system. For example, such commands may control the brightness of the projected image, control the focus of the image, control the volume of an accompanying soundtrack, etc. The predefined commands may also relate to the content of a presentation that includes the projected image.

For example, the predefined commands may include conventional commands more typically associated with pull-down menus or keyboard commands. Such predefined commands may correspond to, but need not be limited to commands to open a file, close a file, restart a presentation, advance to the next slide, or return to the previous slide. Alternatively, the predefined commands may include commands for modifying the content of the projected presentation, such as by altering the projected image. For example, the predefined commands listed above may be combined with voice recognition, permitting additional text to be added to the projected image, or a gesture may be used to outline a figure that is then added to the projected image.

The image sensor may benefit from a calibration procedure, in order to accurately capture the intended image, and in particular, in order to accurately interpret a traced pattern. Such calibration processes may be simplified where the image sensor and the projector utilize the same optical pathway, as discussed above. However, where the image sensor and the digital projector do not share an optical pathway, calibration of the image sensor may be useful in order to accurately map the boundaries of the image that may be captured by the image sensor during the presentation.

A variety of calibration methods and calibration timing may be utilized. Calibration may be automatic upon startup of the projection device, or upon manual activation of a calibration routine, for example using an operator interface such as a touchpad on the projector, or executing a command at the associated processor. The calibration procedure itself may be automatic, or may require operator input. For example, upon execution of a calibration command, the projector may project a test pattern, so that the image sensor may be adjusted so as to center the captured image on the test pattern. Alternatively, the appropriate positioning of the image sensor may include a predetermined offset from the center of the test pattern. The test pattern may include a full screen of a selected color, or alternatively may include a grid or other regular pattern that is readily interpreted by the display system.

Additionally, or in the alternative, the calibration routine may include sequentially 'painting', or projecting a light spot onto, each corner of the area to be captured, permitting the processor to map the painted area for capture and/or interpretation by the display system. Alternatively, the image area designation process may be used by the operator to designate a particular area for tracing interpretable patterns, such as by designating a selected area on a blackboard or whiteboard for the image sensor to analyze for such patterns.

Figure 4:
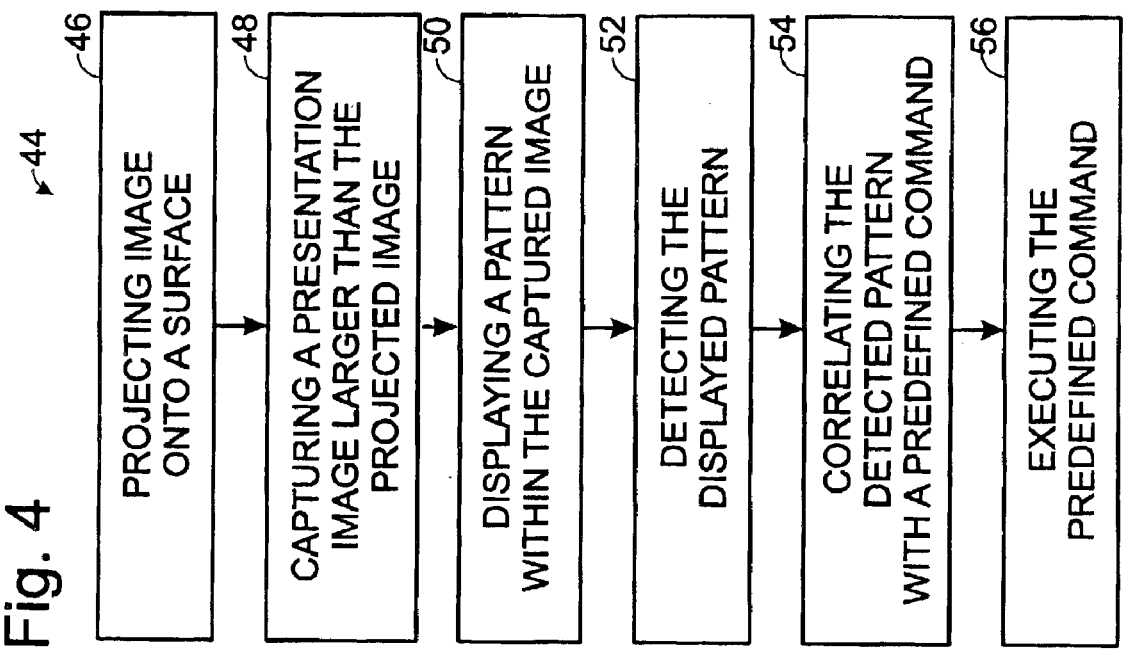
FIG. 4 is a flowchart demonstrating a method of controlling a display system, according to an embodiment of the invention.

It should be appreciated that the display system described herein lends itself to a method of controlling a presentation as set out in flowchart 44 of FIG. 4. In particular, the method may include, but is not limited to, projecting an image onto a surface at 46, capturing a presentation image larger than the projected image at 48, displaying a pattern within the captured image at 50, detecting the displayed pattern at 52, and correlating the detected pattern with a predefined command at 54. As described above, the method may also further include executing the predefined command at 56.

Appropriate software instructions to effect the methodology of an embodiment of the invention may be employed via a computer-readable medium. A "computer-readable medium," as used herein, can be any means that can contain, store, communicate, propagate, or transport such instructions for use by or in connection with an imaging system or imaging apparatus. The computer-readable medium can be, without limitation, an electronic, magnetic, optical, electromagnetic, infrared, or semiconductor system, apparatus, device, or propagation medium. More specific examples of a computer-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), and a portable compact disc read-only memory (CDROM) (optical). Note that the computer-readable medium could even be paper or another suitable medium upon which the program may be printed, as the program can be electronically captured, via for instance optical scanning of the paper or other medium, then compiled, interpreted or otherwise processed in a suitable manner if necessary, and then stored in a computer memory.

The instruction on the computer-readable media may represent an upgrade to display system software previously available, in order to permit the execution of the above-described method, or to execute an upgraded version of such software.

The display system described herein permits a display system operator to record, interact with and/or control a presentation that includes a projected image without intruding upon the content of the projected image. Commands may be executed by the display system by making a subtle hand motion, without interrupting the presentation, accessing a computer, or requiring the projection of menus or setting aside particular regions with the projected image. The resulting presentation may therefore be more seamless and uniform, and more intuitive for both the operator and the viewer.

Although the present disclosure has been provided with reference to the foregoing operational principles and embodiments, it will be apparent to those skilled in the art that various changes in form and detail may be made without departing from the spirit and scope defined in the appended claims. The present disclosure is intended to embrace all such alternatives, modifications and variances that fall within the scope of the appended claims.

What is claimed is:

1. A display device, comprising:
   a light engine configured to project an image onto a display surface;
   an image sensor configured to capture a presentation image larger than the projected image, where the captured image includes an operator providing an operator signal defining an interpretable pattern;
   a processor, coupled to the image sensor, configured to modify the projected image based on the interpretable pattern.

2. The display device of claim 1, where the processor is configured to modify the projected image by altering the performance of the light engine.

3. The display device of claim 1, where the processor is configured to modify the projected image by altering the content of the projected image.

4. The display device of claim 1, including a recorder configured to store the captured image.

5. An interactive projector, comprising:
   a light engine configured to project an image onto a display surface;
   an image sensor configured to capture an operator image including an operator signal; and
   a processor coupled with the image sensor and configured to correlate the operator signal with a predefined command.

6. The projector of claim 5, where the image sensor is configured to capture the operator signal as the operator moves.

7. The projector of claim 5, where the image sensor is configured to capture the projected image.

8. The projector of claim 5, where the processor is configured to modify a presentation according to the predefined command.

9. An interactive projector, comprising:
   a light engine configured to project an image onto a display surface;

an image sensor configured to capture an operator image, including an operator signal;

a processor coupled with the image sensor and configured to correlate the operator signal with a predefined command; and a memory connected to the processor, where the memory includes a database associating a plurality of predefined commands with corresponding operator signals.

10. The projector of claim 5, where the projector is selected from an LCD projector and a micromirror projector.

11. The projector of claim 5, where the image sensor is a camera.

12. A method of controlling a presentation, comprising:

projecting an image onto a surface;

capturing a presentation image larger than the projected image that includes an image of an operator;

displaying a pattern within the captured image;

detecting the displayed pattern; and correlating the detected pattern with a predefined command.

13. The method of claim 12, further comprising executing the predefined command.

14. The method of claim 13, where executing the predefined command includes modifying the projected presentation.

15. A method at controlling a presentation, comprising:

projecting an image onto a surface;

capturing a presentation image larger than the projected image;

displaying a pattern within the captured image;

detecting the displayed pattern; and correlating the detected pattern with a predefined command;

where capturing a presentation image larger then the projected image includes capturing an image of an operator.

16. The method of claim 12, where projecting the image includes directing the projected image along an optical pathway, and capturing the presentation image includes directing the presentation image reciprocally along the substantially same optical pathway.

17. A method of controlling a presentation, comprising:

projecting an image onto a surface;

capturing a presentation image larger than the projected image;

displaying a pattern within the captured image;

detecting the displayed pattern; and correlating the detected pattern with a predefined command;

where displaying a pattern within the captured image includes displaying a cue card.

18. The method of claim 12, where displaying a pattern with the captured image includes tracing an interpretable pattern.

19. The method of claim 18, where tracing the interpretable pattern includes drawing the pattern on a surface.

20. A method of controlling a presentation, comprising:

projecting an image onto a surface;

capturing a presentation image larger than the projected image;

tracing an interpretable pattern within the captured image;

detecting the interpretable pattern; and correlating the interpretable pattern with a predefined command;

where tracing the interpretable pattern includes making a hand motion.

21. The method of claim 18, where correlating the interpretable pattern with the predefined command includes comparing the interpretable pattern with a plurality of predefined patterns.

22. The method of claim 21, where correlating the interpretable pattern with the predefined command further includes selecting a best matching predefined pattern from the plurality of predefined patterns.

23. The method of claim 22, further comprising executing the predefined command corresponding to the best matching predefined pattern.

24. The method of claim 12, further comprising normalizing the captured image.

25. A storage medium readable by a processor, having embodied therein a program of commands executable by the processor to:

project an image onto a surface;

capture a presentation image larger than the projected image that includes an operator image;

detect a pattern displayed within the captured image; and correlate the detected pattern with a predefined command.

26. The storage medium of claim 25, where the program of commands includes commands executable by the processor to execute the predefined command.

27. The storage medium of claim 25, where the program of commands includes commands executable by the processor to capture an image of an operator.

28. A display system, comprising:

means for projecting an image onto a surface;

means for capturing an image that includes an operator image and the projected image;

means for interpreting an operator movement pattern;

means for correlating the operator movement pattern with a predefined command.

29. The display system at claim 28, further comprising means for executing the predefined command.

30. An interactive projector, comprising:

a light engine configured to project an image onto a display surface;

an image sensor configured to capture an operator image and an operator signal defining an interpretable pattern; and a processor coupled with the image sensor and configured to correlate the operator signal with a predefined command.

31. An interactive projector, comprising:

a light engine configured to project a presentation onto a display surface;

an image sensor configured to capture a presentation image larger than the projected image that includes an operator image;

a processor coupled with the image sensor and configured to correlate an operator hand motion with a predefined command; and a memory connected to the processor, where the memory includes a database associating a plurality of predefined commands with corresponding operator hand motions.

* * * * *